United States Patent
Harper

(10) Patent No.: US 7,845,067 B2
(45) Date of Patent: Dec. 7, 2010

(54) ACTUATOR ASSEMBLY METHOD

(75) Inventor: David Harper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/169,426

(22) Filed: Jul. 8, 2008

(65) Prior Publication Data

US 2008/0256786 A1    Oct. 23, 2008

Related U.S. Application Data

(62) Division of application No. 11/218,793, filed on Sep. 2, 2005, now Pat. No. 7,414,812.

(51) Int. Cl.
G11B 5/127    (2006.01)
H04R 31/00    (2006.01)

(52) U.S. Cl. .............. 29/603.03; 29/603.04; 29/603.06; 29/603.07; 360/235.5; 360/244.5; 360/235.8

(58) Field of Classification Search ............. 29/603.03, 29/603.04, 603.06, 603.07; 360/234.5, 244.5, 360/235.8
See application file for complete search history.

(56) References Cited

U.S. PATENT DOCUMENTS

| | | | | |
|---|---|---|---|---|
| 4,498,188 A | * | 2/1985 | Hofer | 381/67 |
| 5,365,390 A | * | 11/1994 | Hasegawa | 360/291.7 |
| 5,949,619 A | * | 9/1999 | Eckberg et al. | 360/106 |
| 6,636,384 B2 | * | 10/2003 | Inoguchi et al. | 360/261.1 |
| 6,704,169 B2 | * | 3/2004 | Nawa | 360/261.3 |
| 6,749,141 B2 | * | 6/2004 | Tamura | 242/340 |
| 6,844,997 B2 | * | 1/2005 | Tamura et al. | 360/261.3 |
| 7,414,812 B2 | | 8/2008 | Harper | 360/261.1 |
| 2002/0080530 A1 | * | 6/2002 | Inoguchi et al. | 360/261.1 |
| 2002/0080531 A1 | * | 6/2002 | Inoguchi et al. | 360/261.1 |

FOREIGN PATENT DOCUMENTS

WO    WO 01/39184 A1 *    5/2001

OTHER PUBLICATIONS

Office Action Summary from U.S. Appl. No. 11/218,793 mailed on Dec. 27, 2007.*
Notice of Allowance from U.S. Appl. No. 11/218,793 mailed on Jun. 2, 2008.*
Supplemental Notice of Allowance from U.S. Appl. No. 11/218,793 mailed on Jun. 16, 2008.*

* cited by examiner

Primary Examiner—Paul D Kim
(74) Attorney, Agent, or Firm—Zilka-Kotab, PC

(57) ABSTRACT

A method for assembling an actuator assembly includes providing a first housing portion and a second housing portion; providing a coil, a pole piece, a magnet, and a completed beam; positioning the coil, pole piece, magnet, and completed beam between the housing portions; and coupling the housing portions together.

19 Claims, 6 Drawing Sheets

ACTUATOR ASSEMBLY METHOD

RELATED APPLICATIONS

This application is a divisional of U.S. patent application Ser. No. 11/218,793, filed Sep. 2, 2005, now U.S. Pat. No. 7,414,812 and which is herein incorporated by reference.

FIELD OF THE INVENTION

The present invention relates to assembly of actuators, and more particularly, this invention relates to assembly of an actuator.

BACKGROUND OF THE INVENTION

Tape drives typically utilize an actuator mechanism to position the read/write head over the appropriate tracks while the tape is moving. Current read/write head positioning devices used in magnetic tape drives often incorporate a dual stage actuator design. One actuator provides coarse positioning to move the read/write head between data bands. The other actuator provides fine positioning to maintain alignment between the read/write head and the data tracks. In use, the coarse positioning actuator first moves the read/write head to the general vicinity on the tape and then the fine positioning actuator is used for track following while the tape is in motion. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds. However, most stepper motors lack the accuracy and bandwidth necessary to maintain alignment between the read/write head and the data tracks as the magnetic tape moves across the face of the read/write head.

The fine positioning actuator is typically a voice coil motor (VCM) mounted on the linear stage and held at a rest position by some type of spring. A VCM actuator provides micron to submicron precision positioning at a bandwidth of hundreds to thousands of hertz. However, a single voice coil and spring combination that can meet the fine positioning requirements across the full width of the tape is expensive and unnecessary. Accordingly, virtually all current tape drives use some combination of a coarse positioning actuator and a fine positioning actuator.

In typical VCM actuator designs for tape drives, the housing must fully encapsulate the magnet and pole piece of the VCM to protect the head from exposure to the stray field caused by the magnet. A beam subassembly, which forms the connection between the coil and the head must pass through a housing that acts as part of the VCM magnetic flux path. This has a result of limiting access to the coil within the housing, requiring the physical connection between the coil and the read/write head to be made up of multiple parts, as well as assembled in multiple steps. This in turn increases both manufacturing and assembly cost.

FIG. 1 illustrates a typical fine positioning VCM assembly 100 for a tape drive system. The VCM assembly 100 includes a bottom cover 102 and a housing 104, which together act to contain the magnetic flux of the VCM so that the flux does not interfere with nearby electronic components, especially the transducers on the head. A beam 106 supports the head in a support cradle 108, thereby allowing the VCM to position the head. The beam 106 is formed of multiple parts, including a top portion 110 and a support plate 112. The top portion 110 of the beam must be inserted through apertures in the housing 104 and coupled to the support plate 112. A coil 114 is then attached to the support plate 112 of the beam 106. A pole piece 116 and magnet 118 are installed to complete the VCM. The bottom cover 102 is attached to the housing 104.

As should now be apparent, a typical VCM assembly 100 contains many parts, and requires a substantial amount of precision assembly. What is needed is a way to simplify assembly of a VCM, thereby reducing both cost and complexity. What is also needed is a way to reduce the number of unique parts needed to create a fine positioning actuator. These unresolved problems and deficiencies are clearly felt in the art and are solved by this invention in the manner described below.

SUMMARY OF THE INVENTION

A method for assembling an actuator assembly includes providing a first housing portion and a second housing portion; providing a coil, a pole piece, a magnet, and a completed beam; positioning the coil, pole piece, magnet, and completed beam between the housing portions; and coupling the housing portions together.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

BEST MODE FOR CARRYING OUT THE INVENTION

Figure 1:
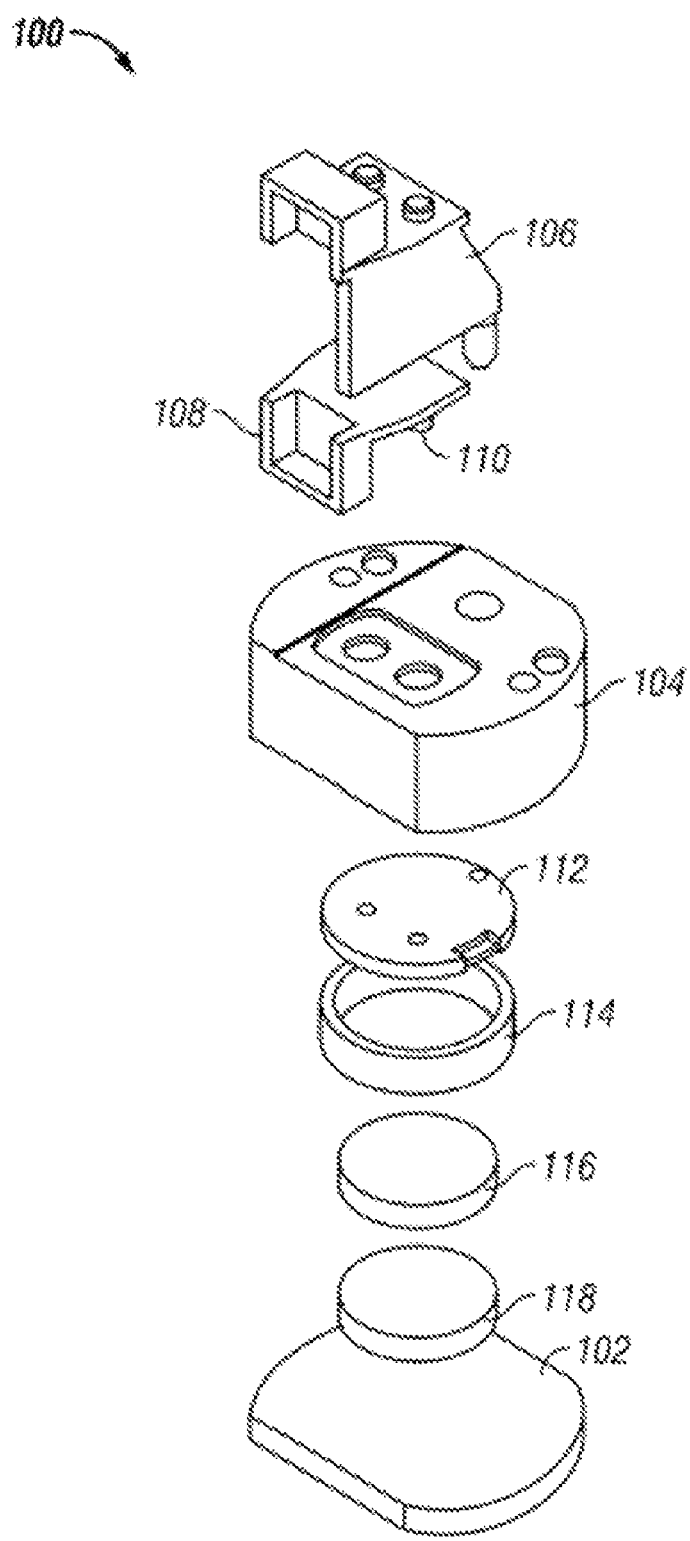
FIG. 1 is an exploded view of a fine positioning VCM assembly.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The description below discloses various embodiments of a new actuator assembly that requires fewer unique parts and is easier to assemble than prior known VCM actuators. The new assembly features a "clamshell" type housing that allows use of a one-piece beam while still allowing for the housing to provide the necessary flux path as well as protection to the read/write head, thus reducing the overall actuator cost. Thus, the inventive actuator assembly provides a compact, reduced cost design that exhibits excellent reliability. To aid the reader and to place the actuator in a context, the following description shall be described in terms of an actuator for positioning a tape head with respect to a tape passing over the tape head. However, while the actuator has particular applicability to tape drives, the actuator can be implemented in any system where actuation is needed.

Figure 2:
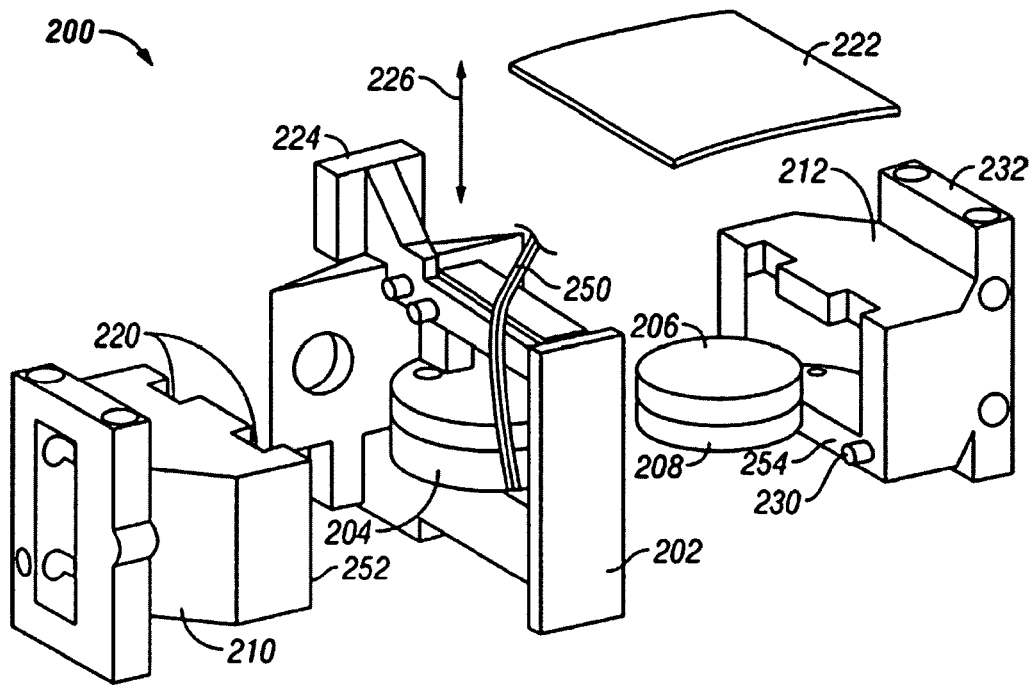
FIG. 2 is an exploded view of a fine positioning VCM assembly according to one embodiment.
Figure 3:
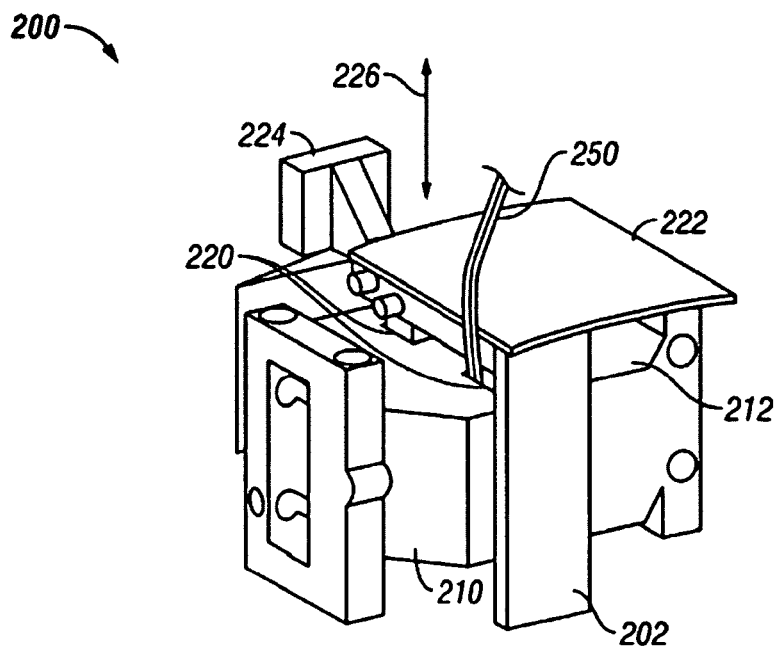
FIG. 3 is a perspective view of the fine positioning VCM assembly of FIG. 2 after assembly.

FIGS. 2 and 3 illustrate a VCM actuator assembly 200 according to one embodiment of the present invention. As shown, a beam 202, coil 204, pole piece 206, and magnet 208 are sandwiched between two housing portions 210 and 212 that together form the housing having an interior and an exterior. When assembled, the magnet 208, pole piece 206, coil 204, and part of the beam 202 are contained in the interior of the housing, with the housing providing a portion of the magnetic path.

The beam 202 extends through slots 220 in the upper portion of the housing and floats over the pole piece 206 and magnet 208 assembly. When the coil 204 is energized, the beam 202 moves back and forth based on the current in the coil 204 and the resulting magnetic interaction of the energized coil 204 with the magnet 208.

The separable nature of the housing portions 210, 212 allows the beam 202 to be constructed as a one-piece, completed structure prior to assembly of the actuator. In other words, the completed beam 202 can be formed of a single piece of material, or can be assembled prior to coupling with the housing, as opposed to previous methods where the beam must be partially assembled concurrently with the actuator as described above with reference to FIG. 1. Thus the inventive actuator assembly 200 is less expensive and easier to assemble than prior actuators due to the fact that the housing portions 210, 212 are simply closed about the completed beam 202.

The beam 202 can be constructed of plastic, metal, or any other suitable material. Plastic is preferred, as the entire beam 202 can be molded in one step. A further benefit of plastic is that the coil 204 can be integral to the beam, e.g., the coil can be insert-molded into a beam primarily formed of plastic if desired, though typically the coil 204 will be coupled to the beam 202, e.g., by adhesive, in a separate processing step. Further, by forming the beam 202 in one piece, a precision part can be manufactured.

The magnet 208 is preferably cylindrical in periphery. Any suitable magnetic material can be implemented in the magnet 208. The housing helps to keep the flux contained to the actuator assembly 200, so that it does not interfere with operation of the host device or data stored on the tape. The housing also helps prevent external magnetic fields, e.g., from the drive motors, from affecting the VCM.

The pole piece 206 is preferably a solid member having, but not limited to, a cylinder-shaped outer surface, and that is designed to allow the coil 204 to move the beam 202 within the desired range of motion. The pole piece 206 is preferably constructed of a material capable of channeling the flux emitted by the magnet 208. Illustrative metals from which the pole piece 206 can be constructed include iron and iron alloys, preferably low carbon steels. One preferred material is magnetic stainless steel.

The coil 204 is adjacent the pole piece 206. The magnetic field generated by the pole piece 206, housing, and magnet 208 passes through the coil 204 in an orientation that will cause a displacement when current is applied through the coil 204. The displacement causes movement of the beam 202. An electrical connection couples the coil 204 to a controller, the controller controlling the current through the coil 204. The electrical connection may include coil control wiring 250 such as a flexible cable, wires embedded in or otherwise coupled to the beam 202, combinations thereof, etc. Note that the coil 204 is shown coupled to the beam 202. However, other VCM configurations than those shown here can be used. For example, the coil 204 may be operatively coupled to the housing, and the magnet 208 and pole piece 206 may be coupled to the beam 202.

In a tape drive embodiment, the beam 202 includes a head mounting portion 224 that receives a magnetic head such as a tape head. As shown in FIG. 2, the head mounting portion 224 is parallel to but offset laterally from the axis of movement 226 of the beam 202 relative to the magnet 208 and pole piece 206. This allows the overall assembly 200 to have a low profile. One skilled in the art will appreciate that the head mounting portion can be coupled at other locations on the beam 202, such as above the beam 202 and generally aligned with the coil 204 and magnet 208 generally parallel to the axis of movement 226.

Movement of the beam 202 is constrained by a constraining member 222, which preferably also holds the beam 202 in an at-rest position when the coil 204 is not energized. An illustrative constraining member 222 is a leaf spring (as shown in FIGS. 2 and 3) coupled to a constraining member mounting portion 232 of one of the housing portions and a portion of the beam 202 located outside the housing. To reduce torque effects, two constraining members 222 may be present, one coupled to each housing portion 210, 212. One skilled in the art will appreciate that many kinds of constraining members may be used, including rollers, rigid members having a resiliently deformable component (e.g., foam, coil springs, etc.) coupled between the beam 202 and the rigid member, piston and cylinder devices, etc. Additional options include a bushing and shaft arrangement with optional damping. Further illustrative constraining members include friction-inducing members coupled to the housing or beam 202.

The housing portions 210, 212 can take several forms. As discussed immediately hereafter, the housing portions 210, 212 can be identical, symmetrical, or different.

In one embodiment, the housing portions 210, 212 are two identical parts to form the housing shell (as shown in FIG. 2). In other words, the two halves of the housing can be designed to be identical parts for cost reduction purposes, therefore essentially allowing one part to be used for both the left and right half of the housing assembly.

In another embodiment, the housing portions 210, 212 are about or exactly symmetrical relative to each other about their edges of coupling 252, 254. Thus, the housing portions 210, 212 may not be the same part, but have about the same general shape. This embodiment may be useful where the coarse positioner (described below) is coupled to one side of the assembly 200, e.g., opposite the head mounting portion 224.

Figure 4:
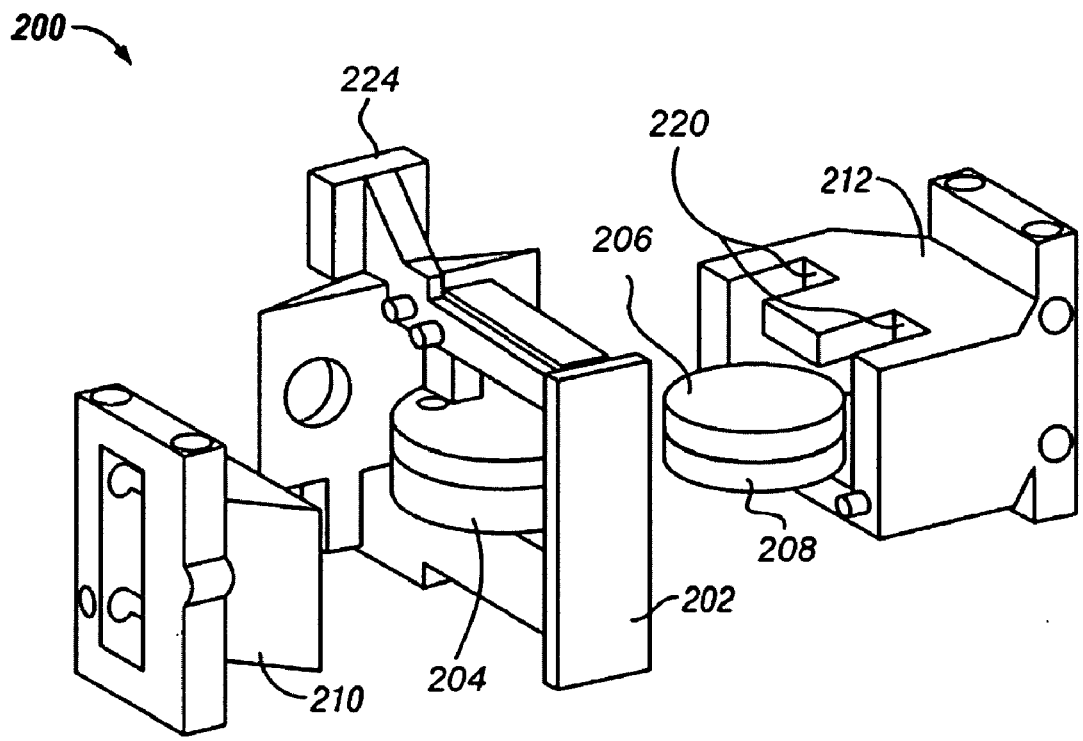
FIG. 4 is an exploded view of a fine positioning VCM assembly according to another embodiment.
Figure 5:
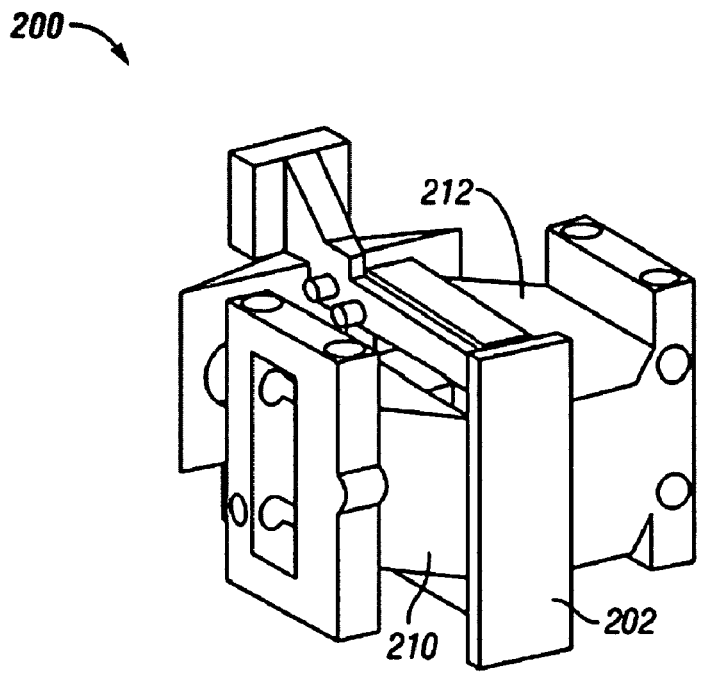
FIG. 5 is a perspective view of the fine positioning VCM assembly of FIG. 4 after assembly.

In a further embodiment, shown in FIGS. 4 and 5, the housing portions 210, 212 are not symmetrical or identical. Rather, one of the housing portions 212 surrounds more of the internal components of the assembly 200 than the other portion 210.

The housing portions 210, 212 may include interlocking elements that allow precise alignment of the housing portions 210, 212 relative to each other. As shown in FIG. 2, the interlocking elements can include a flange 230 that is insertable in a corresponding groove or aperture (not shown) in the opposing housing portion. The interlocking elements may also provide frictional coupling of the housing portions 210, 212, such as snap-locks, etc.

With continued reference to FIG. 2, the housing portions 210, 212 may be constructed of any suitable material, keeping in mind that the housing may form part of the flux path. The housing can be formed of the same material as the pole piece 206. Illustrative materials from which the housing portions 210, 212 may be formed are low carbon steels. One preferred housing material is magnetic stainless steel.

The VCM assembly procedure is rather simple. During assembly, the coil 204 is coupled to the completed beam 202 and connected to the coil control wiring 250. Again, the coil control wiring 250 may be coupled to the beam 202 or may be formed integral with the beam 202, etc. The magnet 208, pole piece 206, coil 204, and beam 202 are inserted into one of the housing portions 210, 212. The pole piece and magnet assembly may be coupled to one of the housing pieces via an adhesive, threaded fasteners, frictional coupling, tongue and groove assembly, etc. if desired. Then, the other housing portion is added and coupled to the first housing portion to complete the assembly, via an adhesive, threaded fasteners, clamps, frictional coupling, etc. For further cost reduction, the coil 204 and flexures (not shown) can be insert-molded as part of the beam 202, thus further simplifying the assembly process and reducing the overall number of parts needed for the VCM.

A coarse positioning actuator of a type known in the art can be coupled to the completed assembly 200. Such coarse positioning actuators typically provide a greater range of motion than that of the beam of the VCM actuator assembly 200. The two actuators can be mounted in a "piggyback" arrangement with the fine position VCM actuator assembly 200 riding on the coarse position actuator. One type of coarse positioning actuator is a linear stage driven by a stepper motor. Stepper motors have the ability to move the linear stage anywhere across the width of a magnetic tape at modest speeds.

Figure 6:
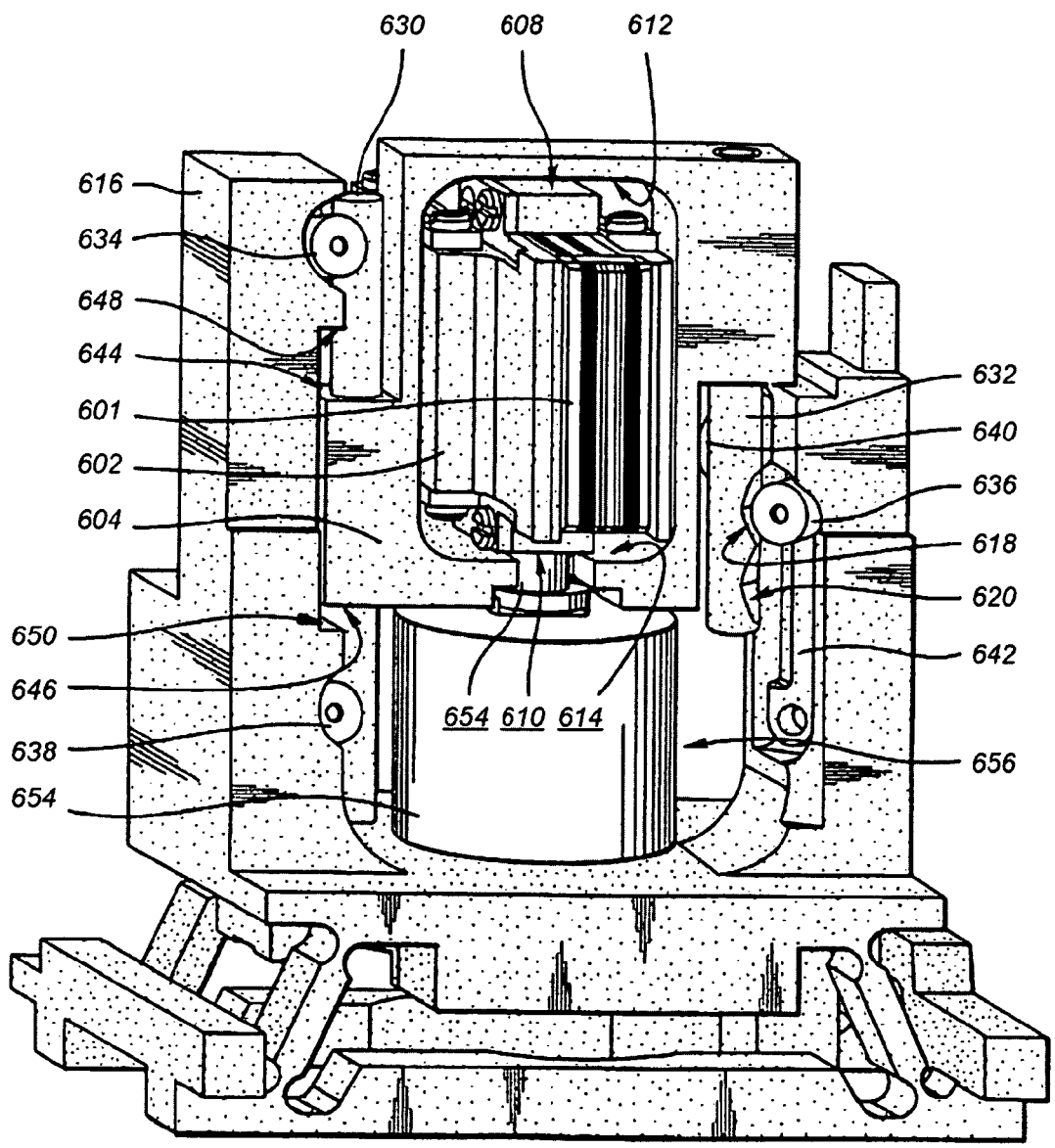
FIG. 6 is a perspective view of a coarse positioning actuator implemented in a tape drive system as seen from the tape medium side.

FIG. 6 is a perspective view of a coarse positioning actuator implemented in a tape drive system as seen from the tape medium (not shown) side. Referring to FIG. 6, the transducer (tape head) 601 is mounted on the carriage 602, which includes the VCM actuator assembly 200. A resilient member (not shown) connects the carriage 602 to a moving frame 604. The resilient member can include flexures (not shown) made of thin metal strips that allow the carriage 602 to be displaced laterally (as defined by the tape medium) but not longitudinally with respect to the moving frame 604. Mechanical stops 608 and 610 are the top and bottom surfaces respectively of the carriage 602. Stop abutments 612 and 614 are inside surfaces of the moving carriage 604 opposite the mechanical stops 608 and 610 respectively.

The moving frame 604 slides relative to the fixed frame 616 on two rails 630 and 632 are guided by several guide bearings 634, 636, 638, 640. These guide bearings are rotatably mounted to the fixed frame 616. One of the bearings 636 is attached to the fixed frame 616 by a load arm 642 and acts as both a guide bearing and the click. Two detent notches 618 and 620 in rail 632 define two discrete positions for coarse positioning of the transducer 601.

Additional mechanical stops 644 and 646 and stop abutments 648 and 650 are defined on surfaces of the moving frame 604 and fixed frame 616 respectively. The mechanical stops 644-646 and the stop abutments 648-650 mechanically limit the range of motion of moving frame 604 with respect to the fixed frame 616. This keeps the rails 630 and 632 in contact with the guide bearings 634-640 and the guide/click bearing 636.

A motor 652 rotates a threaded shaft 654 of the actuator 656 that in turn causes movement of the carriage 602.

In use in a tape drive, the coarse positioning actuator first moves the read/write head to the general vicinity on the tape and then the fine positioning actuator 200 is used for track following while the tape is in motion. Once the target region on the tape has been reached by coarse positioning, the coil will be activated to precisely position the read/write head over the desired location on the tape. During track following, the current in the coil is constantly adjusted to account for the excursion of the tracks on the tape as well as the lateral motion of the tape while the tape is moving.

Figure 7:
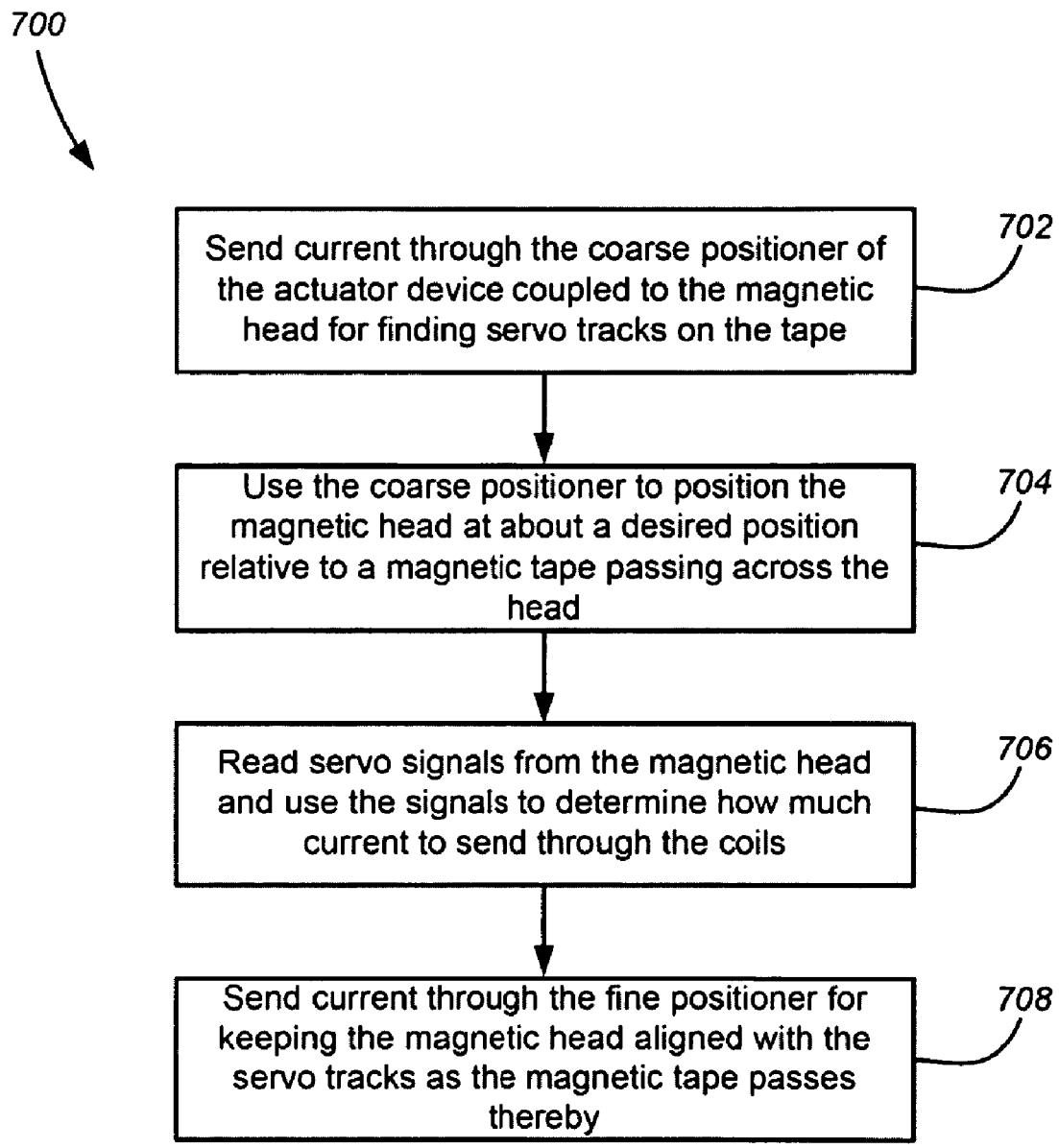
FIG. 7 illustrates a method for positioning a tape head relative to a tape.

FIG. 7 depicts one method 700 for positioning a magnetic tape head relative to a tape. In operation 702, a current is sent through a coarse positioning actuator coupled to the magnetic head for finding servo tracks on the tape. In operation 704, the coarse positioner is used to position the magnetic head at about a desired position relative to a magnetic tape passing across the head. In operation 706, servo signals are read from the magnetic head and used to determine how much current to send through the coils. In operation 708, a current is sent through the fine positioner for keeping the magnetic head aligned with the servo tracks as the magnetic tape passes thereby.

Figure 8:
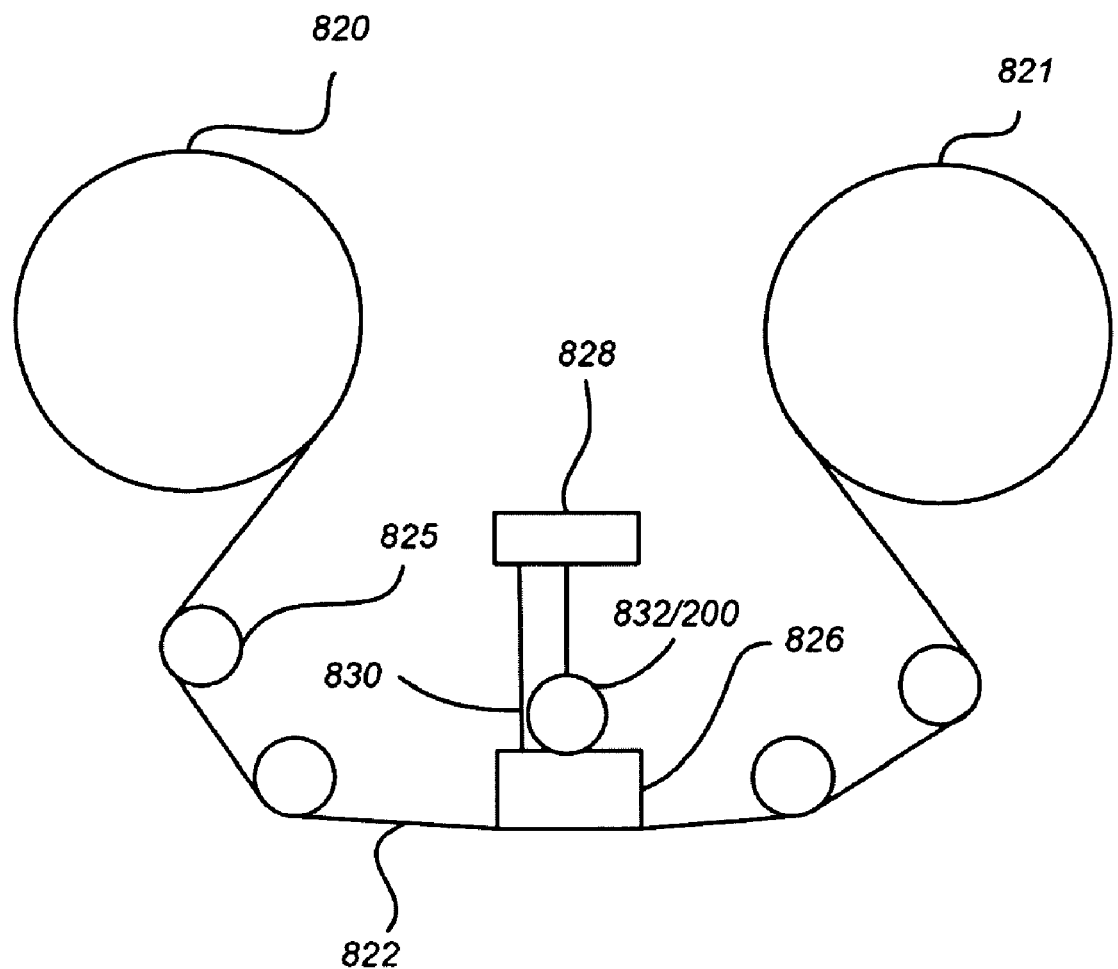
FIG. 8 is a schematic diagram of the tape drive system.

FIG. 8 illustrates a tape drive which may be employed in the context of the present invention. While one specific implementation of a tape drive is shown in FIG. 5, it should be noted that the embodiments of the previous figures may be implemented in the context of any type of drive (i.e. hard drive, tape drive, etc.).

As shown, a tape supply cartridge 820 and a take-up reel 821 are provided to support a tape 822. These may form part of a removable cassette and are not necessarily part of the system. Guides 825 guide the tape 822 across a preferably bidirectional tape head 826. Such tape head 826 is in turn coupled to a controller assembly 828 via an MR connector cable 830. The controller 828, in turn, controls head functions such as servo following, write bursts, read functions, etc. An actuator assembly 832, which includes a VCM assembly 200 as described above, controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for assembling an actuator assembly, comprising:
   providing a first housing portion and a second housing portion;
   providing a coil, a pole piece, a magnet, and a completed beam;

positioning the coil, pole piece, magnet, and completed beam between the housing portions; and coupling the housing portions together, wherein a head mounting portion is coupled to the beam, the head mounting portion being adapted for receiving a magnetic head.

2. The method as recited in claim 1, wherein the housing portions are identical.

3. The method as recited in claim 1, wherein the housing portions are symmetrical about an edge of coupling thereof.

4. The method as recited in claim 1, wherein the beam is primarily constructed of at least one piece of plastic or at least one piece of metal.

5. The method as recited in claim 1, wherein the coil is an integral portion of the beam.

6. The method as recited in claim 1, further comprising a step of providing a constraining member for constraining movement of the beam relative to the housing.

7. A method for assembling an actuator assembly, comprising:

providing a first housing portion and a second housing portion;

providing a coil, a pole piece, a magnet, and a completed beam;

positioning the coil, pole piece, magnet, and completed beam between the housing portions;

coupling the housing portions together; and coupling a coarse positioning actuator to the housing, the coarse actuator having a greater range of movement than the beam.

8. The method as recited in claim 7, wherein the housing portions are identical.

9. The method as recited in claim 7, wherein the housing portions are symmetrical about an edge of coupling thereof.

10. The method as recited in claim 7, wherein the coil is an integral portion of the beam.

11. The method as recited in claim 7, further comprising a step of providing a constraining member for constraining movement of the beam relative to the housing.

12. A method for assembling an actuator assembly, comprising:

providing a first housing portion and a second housing portion;

providing a coil, a pole piece, a magnet, and a completed beam;

positioning the coil, pole piece, magnet, and completed beam between the housing portions; and coupling the housing portions together, wherein the beam is movable relative to the housing portions, the beam extending from an interior of a housing defined between the housing portions to an exterior thereof.

13. The method as recited in claim 12, wherein the housing portions are identical.

14. The method as recited in claim 12, wherein the housing portions are symmetrical about an edge of coupling thereof.

15. The method as recited in claim 12, wherein the coil is an integral portion of the beam.

16. The method as recited in claim 12, further comprising a step of providing a constraining member for constraining movement of the beam relative to the housing.

17. A method for assembling an actuator assembly, comprising:

providing a first housing portion and a second housing portion;

providing a coil, a pole piece, a magnet, and a completed beam;

positioning the coil, pole piece, magnet, and completed beam between the housing portions; and coupling the housing portions together, wherein the beam is primarily constructed of at least one piece of plastic or at least one piece of metal, wherein the beam is movable relative to the housing portions, the beam extending from an interior of a housing defined between the housing portions to an exterior thereof.

18. The method as recited in claim 17, wherein the housing portions are identical.

19. The method as recited in claim 17, wherein the housing portions are symmetrical about an edge of coupling thereof.

* * * * *